(12) United States Patent
Das et al.

(10) Patent No.: US 8,340,436 B2
(45) Date of Patent: Dec. 25, 2012

(54) DETECTING SIGNIFICANT EVENTS IN CONSUMER IMAGE COLLECTIONS

(75) Inventors: Madirakshi Das, Penfield, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 795 days.

(21) Appl. No.: 12/487,686

(22) Filed: Jun. 19, 2009

(65) Prior Publication Data

US 2010/0322524 A1 Dec. 23, 2010

(51) Int. Cl.
G06K 9/62 (2006.01)
(52) U.S. Cl. ........................................................ 382/224
(58) Field of Classification Search .................. None
See application file for complete search history.

(56) References Cited

U.S. PATENT DOCUMENTS

| | | | |
|---|---|---|---|
| 6,351,556 B1 | 2/2002 | Loui | |
| 6,606,411 B1 | 8/2003 | Loui | |
| 6,915,011 B2 | 7/2005 | Loui et al. | |
| 2003/0065409 A1 | 4/2003 | Raeth et al. | |
| 2003/0198390 A1* | 10/2003 | Loui et al. | 382/224 |
| 2008/0033991 A1 | 2/2008 | Basak et al. | |
| 2008/0219544 A1* | 9/2008 | Tasaki et al. | 382/141 |

FOREIGN PATENT DOCUMENTS

| | | |
|---|---|---|
| EP | 0 990 996 A2 | 4/2000 |
| EP | 1 785 896 A2 | 5/2007 |

OTHER PUBLICATIONS

Adrian Graham et al., "Time as Essence for Photo Browsing Through Personal Digital Libraries", In Proceedings of the 2$^{nd}$ ACM/IEEE-CS joint conference on Digital libraries—JCDL '02, Published Jul. 13, 2002, [retrieved Mar. 14, 2011]. Retrieved from the Internet <URL:http://citeseerx.ist.psu.edu/viewdoc/summary?doi=10.1.1. 94.6397> entire document, especially Abstrac; Figs. 1-5; p. 1, col. 2; p. 2, col. 2; p. 3, col. 1 to col. 2; p. 4, col. 2; p. 5, col. 1; p. 6, col. 1.
Mor Naaman et al., "Automatic Organization for Digital Photographs With Geographic Coordinates", In Proceedings of the 4$^{th}$ ACM/ IEEE-CS joint conference on Digital libraries—JCDL 2004, Published Jun. 7, 2004, [retrieved Mar. 14, 2011]. Retrieved from the Internet <URL: http://ilpubs.stanford.edu:8090/766/1/2004-27.pdf> entire document ; Fig 4.
Brockwell and David, supra pp. 179-187, Chapter 6 Nonstationary and Season Time Series Models.
Loui et al, Multidimensional image value assessment and ratiang for automated albuming and retrieval, Proc. IEEE Intern. Conf. on Image Processing (ICIP) 2008.
Cerosaletti et al, Measuring the perceived asthetic quality of photographic images, Proc. 1$^{st}$ International Workshop on Quality of Multidmedia Experience (QoMEX), 2009.

(Continued)

*Primary Examiner* — Bhavesh Mehta
*Assistant Examiner* — Nirav G Patel
(74) *Attorney, Agent, or Firm* — Raymond L. Owens

(57) ABSTRACT

A method for determining significant events in a digital image collection, including, using a processor for generating image counts time-series from the image collection; computing a model of the image counts time-series; and using the image counts time-series and the model to determine significant events.

7 Claims, 9 Drawing Sheets

OTHER PUBLICATIONS

Brockwell and Davis, supra, pp. 94-95, ARMA Models, Chapter 3.
Brockwell and Davis, supra, pp. 166-167—Chapter 5, Modeling and forecastingwith ARMA Processes.
Brockwell and Davis, Supra, pp. 171-175, Chapter 5—Modeling and Forecasting with ARMA Processes.

Alex C. Loui, et al.: "Automated Event Clustering and Quality Screening of Consumer Pictures for Digital Albuming", IEEE Transactions on Multimedia, IEEE Service Center, Piscataway, NJ, US LNKD-DOI:10.1109/TMM.2003.814723, vol. 5, No. 3, Sep. 1, 2003, pp. 390-402, XP002374762, ISSN: 1520-9210, the whole document.

* cited by examiner

DETECTING SIGNIFICANT EVENTS IN CONSUMER IMAGE COLLECTIONS

FIELD OF THE INVENTION

The invention relates generally to the field of digital image processing, and in particular to a method for identifying groups of digital images that portray significant events in consumer image collections.

BACKGROUND OF THE INVENTION

The proliferation of digital cameras and scanners has lead to an explosion of digital images, creating large personal image databases. Since taking digital pictures is easy and practically free, consumers no longer restrict picture-taking to important events and special occasions. Images are being captured frequently, and of day-to-day occurrences in the consumers' life. Since a typical user has already accumulated many years of digital images, browsing the collection to find images taken during important events is already a time-consuming process for the consumer.

There has been work in grouping images into events. U.S. Pat. No. 6,606,411, assigned to A. Loui and E. Pavie, entitled "A method for automatically classifying images into events," issued Aug. 12, 2003 and U.S. Pat. No. 6,351,556, assigned to A. Loui, and E. Pavie, entitled "A method for automatically comparing content of images for classification into events," issued Feb. 26, 2002, disclose algorithms for clustering image content by temporal events and sub-events. According to U.S. Pat. No. 6,606,411 events have consistent color distributions, and therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Another method of automatically organzing images into events is disclosed in U.S. Pat. No. 6,915,011, assigned to A. Loui, M. Jeanson, and Z. Sun, entitled "Event clustering of images using foreground and background segmentation" issued Jul. 5, 2005. The events detected are chronologically ordered in a timeline from earliest to latest.

Using the above methods, it is possible to reduce the amount of browsing required by the user to locate a particular event by viewing representatives of the events along a timeline, instead of each image thumbnail. However, a typical user may still generate over 100 such events during a calendar year, and more prolific picture-takers can easily exceed a few hundred detected events. Many of these events depict day-to-day activities, and not important or special occasions as identified by the users. There is a need for creating a small set of important or special events (denoted as significant events in this document), that make it easy for the user to browse an overview of their collection. In addition, significant events need to be customized to a particular user's picture-taking behavior. For example, a person that rarely takes any pictures except during special occasions should have most of their images included in significant events; whereas a person that habitually takes many pictures daily may have a small fraction of all captured images included in significant events.

SUMMARY OF THE INVENTION

In accordance with the present invention, there is provided a method for determining significant events in a digital image collection, comprising, using a processor for (a) generating image counts time-series from the image collection;

(b) computing a model of the image counts time-series; and (c) using the image counts time-series and the model to determine significant events.

Every user has a typical picture-taking behavior; and significant events are usually those that do not fit within this typical behavior. In this invention, a user's picture-taking behavior is translated into a time-series, where there is a data point for each time step. Time-series modeling techniques are then used to model this data at different time granularities. This model describes the user's typical picture-taking behavior, and varies from user to user. Significant events are identified by the deviation of the actual data from the output of the model fitted to the user's data.

ADVANTAGES

The organization and retrieval of images and videos is a problem for the typical consumer. It is useful for the user to be able to browse an overview of important events in their collection. Technology disclosed in prior art allows the classification of images in a collection into events, but not the ability to ascertain the importance or significance of such events. As a result, these include uninteresting or common day-to-day events that inflate the number of events to the point where it is difficult to find significant events even when browsing a list of events. This invention identifies a small sub-set of events detected in a collection that have a high probability of being significant. The detection of significant events is also customized to a user's picture-taking behavior.

DETAILED DESCRIPTION OF THE INVENTION

The present invention can be implemented in computer systems as will be well known to those skilled in the art. In the following description, some embodiments of the present invention will be described as software programs. Those skilled in the art will readily recognize that the equivalent of such a method may also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts. Videos in a collection are included in the term "images" in the rest of the description.

Figure 1:
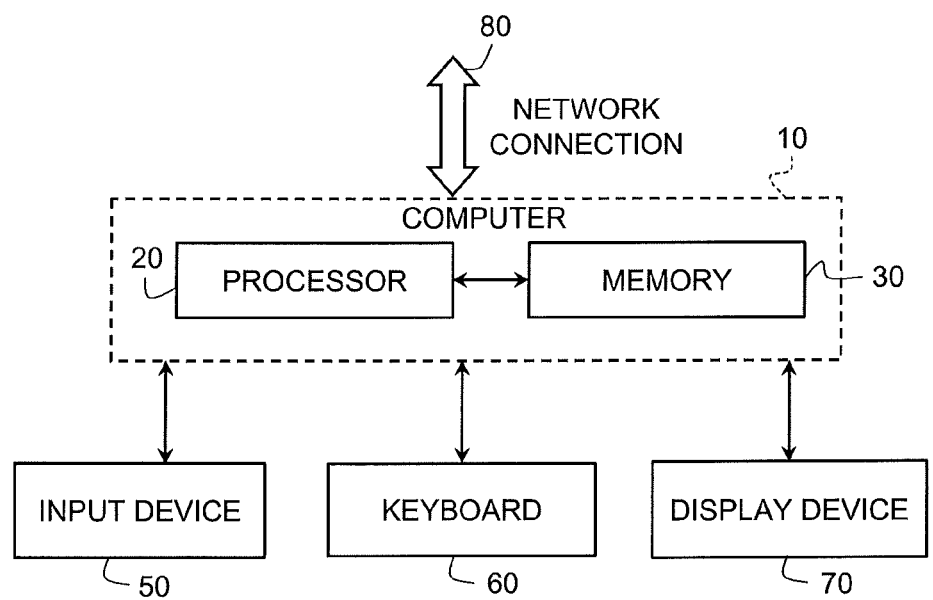
FIG. 1 is a block diagram of a system that practices the present invention.

The present invention can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, or any other system for the processing of digital images. The computer 10 includes a microprocessor-based unit 20 (also referred to herein as a processor) for receiving and processing software programs and for performing other processing functions. A memory unit 30 stores user-supplied and computer-generated data which may be accessed by the processor 20 when running a computer program. A display device (such as a monitor) 70 is electrically connected to the computer 10 for displaying information and data associated with the software, e.g., by means of a graphical user interface. A keyboard 60 is also connected to the computer. As an alternative to using the keyboard 60 for input, a mouse can be used for moving a selector on the display device 70 and for selecting an item on which the selector overlays, as is well known in the art. Input devices 50 such as compact disks (CD) and DVDs can be inserted into the computer 10 for inputting the software programs and other information to the computer 10 and the processor 20. Still further, the computer 10 can be programmed, as is well known in the art, for storing the software program internally. In addition, media files (such as images, music and videos) can be transferred to the memory 30 of the computer 10 by means of input devices 50 such as memory cards, thumb drives, CDs and DVDs, or by connecting a capture device (such as camera, cell phone, video recorder) directly to the computer 10 as an input device. The computer 10 can have a network connection, such as a telephone line or wireless connection 80, to an external network, such as a local area network or the Internet. Software programs and media files can be transferred to the computer from other computers or the Internet through the network connection.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

Figure 2:
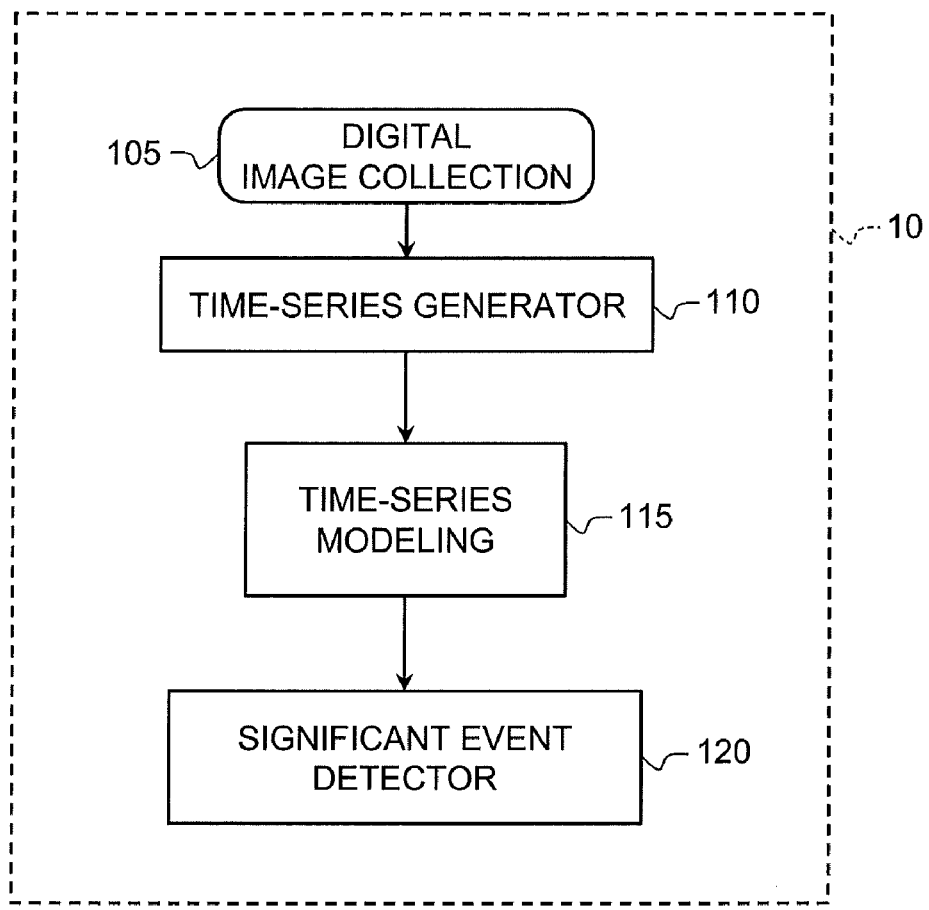
FIG. 2 is an overall flowchart of the method practiced by FIG. 1.
Figure 3:
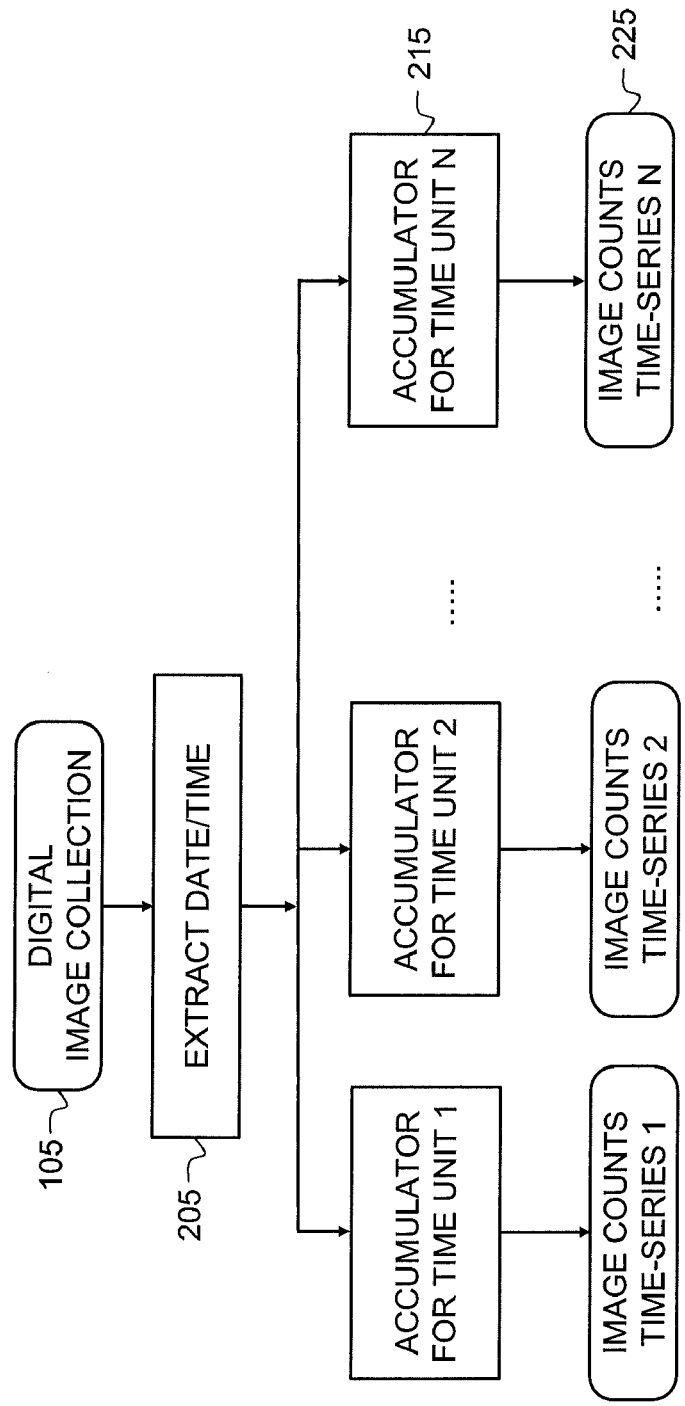
FIG. 3 is a more detailed flowchart of the time-series generator shown in block 110 of FIG. 2.

Referring to FIG. 2, a user's digital image collection 105 resides in the memory 30 of a computer 10. The other blocks in the figure are implemented by a software program and are executed by the processor 20 of the computer 10. The digital image collection 105 is provided to a time-series generator 110. FIG. 3 shows the steps in the time-series generation process. The image capture date and time information are extracted 205 from the EXIF metadata stored in the image files of the digital image collection 105 by the capture device (such as a camera). A set of time units are determined—these time units could be a few months (capturing a season), a month, a week, a day, or hours—the size of the unit being referred to as granularity. Since there is one image count generated per time unit, the range of time units chosen is limited by the size of the image collection. Since at least 40 to 50 data points are needed for producing reliable results, a collection spanning one year is limited to a maximum granularity of one week; and season-level granularity would require a collection spanning 10 years or more. In the preferred embodiment, the finest granularity used is parts of a day (morning, afternoon, evening), with the maximum granularity being determined by the size of the image collection. Using at least one year of the user's collection is recommended. The accumulators 215 count the number of images in each time unit with the beginning of the collection being at unit zero, producing a set of image counts time-series 225.

Figure 4:
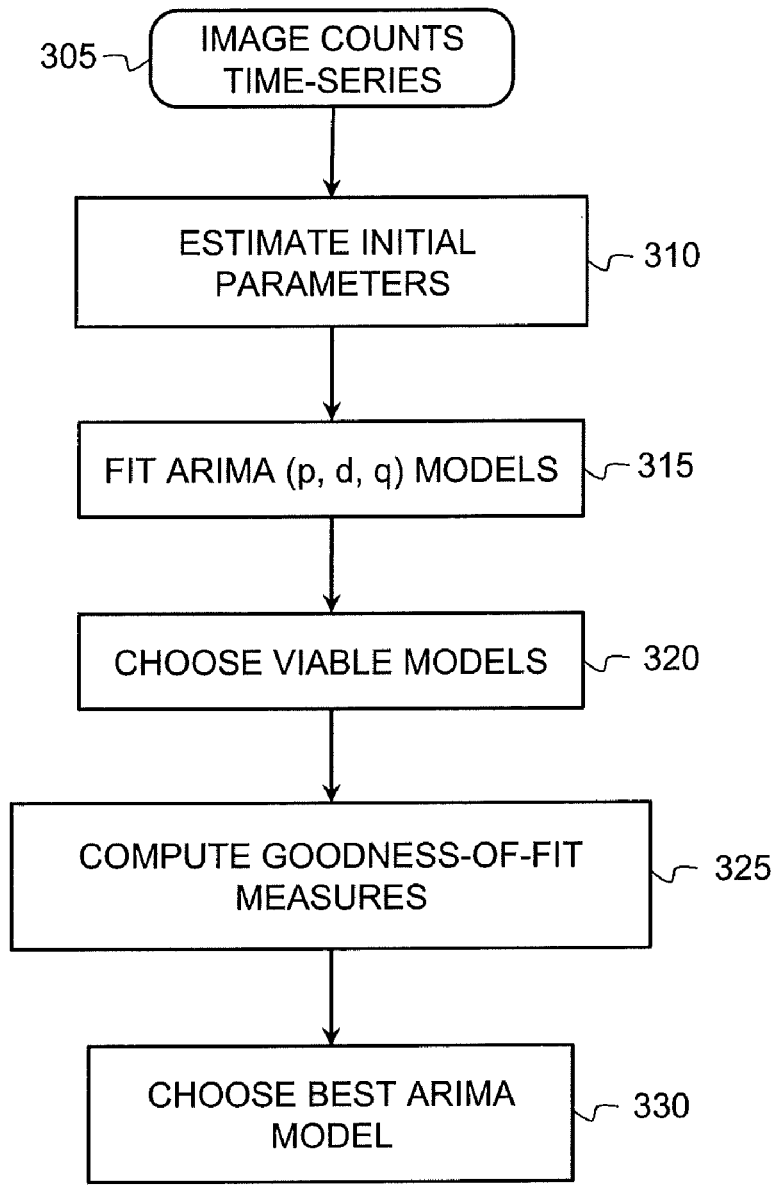
FIG. 4 is a more detailed flowchart of the time-series modeling block 115 of FIG. 2.

Referring to FIG. 2, the image counts time-series is analyzed to find a model that fits the image counts 115. FIG. 4 shows the steps in time-series modeling to generate a suitable model. There are many well established methods for time-series modeling (ref "Introduction to Time Series and Forecasting", Brockwell and Davis, Springer-Verlag 2002). The image counts time-series are typically non-stationary (i.e. their mean and standard deviation may vary over time). Since pictures are often taken in groups, e.g. there may be consecutive days of picture-taking during vacations and family gatherings, and consecutive days of zero image counts during week-days, the model needs to include an auto-regressive component that captures the correlation with previous values of the data. The model also needs to include a moving average component that can capture gradual changes in picture-taking behavior. The model that is appropriate in this situation is the ARIMA (Auto-Regressive Integrated Moving Average) model (Brockwell and Davis, supra, pp 179-187). The model ARIMA (p,d,q) has three main parameters—p being the order of the autoregressive component, q being the order of the moving average component and d being the order of differencing required for dealing with the deviations from stationarity. An ARIMA p,d,q) model is given by $$\left(1 - \sum_{i=1}^{p} \phi_i L^i\right)(1 - L)^d X_t = \left(1 + \sum_{j=1}^{q} \theta_j L^j\right)\varepsilon_t \quad (1)$$

where L is the lag operator, $\phi$ are the parameters of the autoregressive part of the model, $\theta$ are the parameters of the moving average part, and the $\varepsilon$ are the error terms. The error terms are generally assumed to be independent, identically distributed (iid) variables sampled from a normal distribution with zero mean.

Figure 5A:
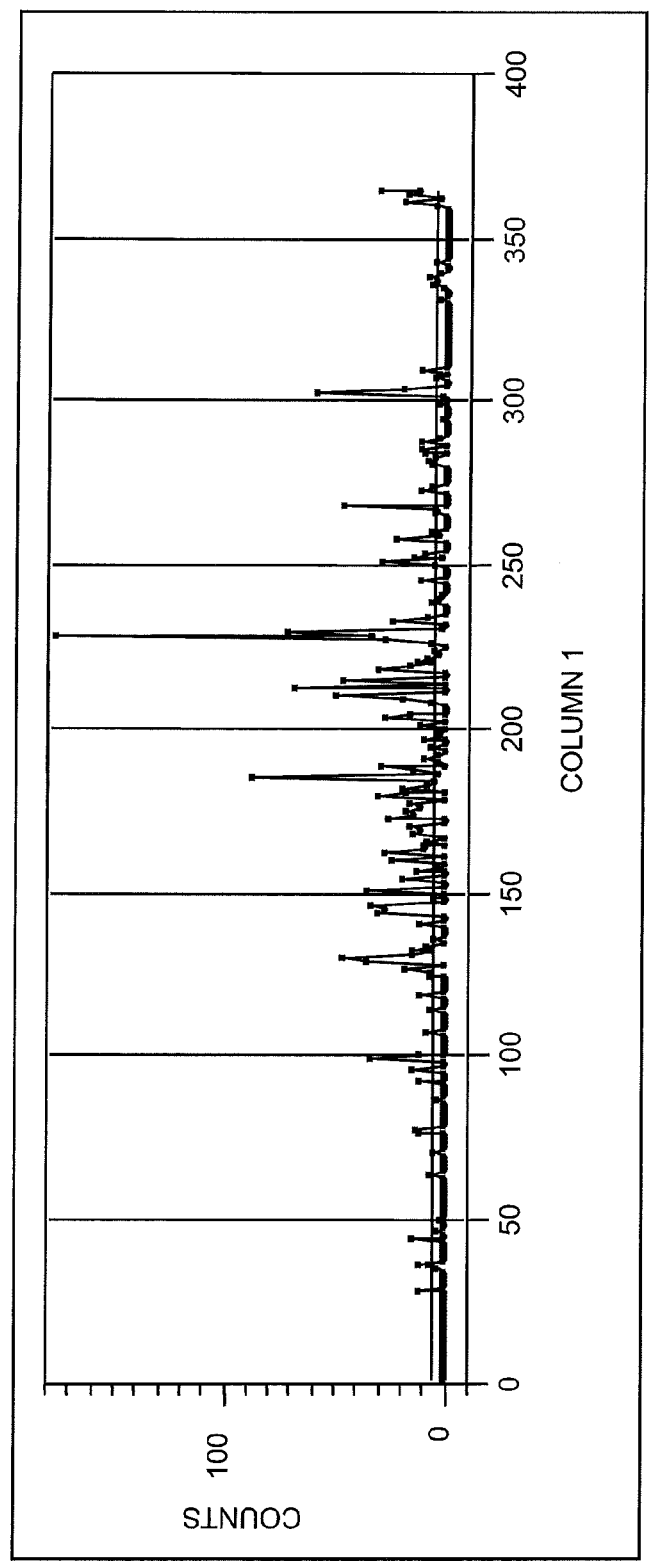
FIGS. 5(a), (b) and (c) show a specific example of the image counts time-series and analysis produced in accordance with the present invention.
Figure 5B:
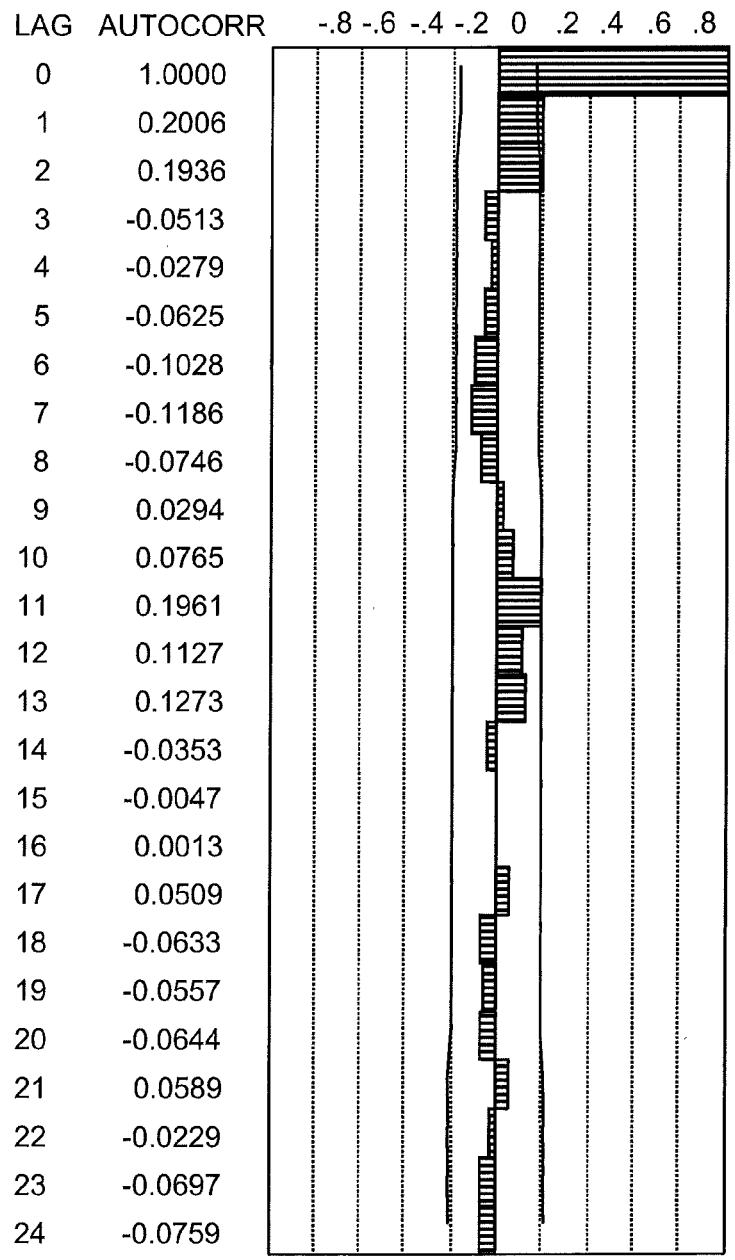
Figure 5C:
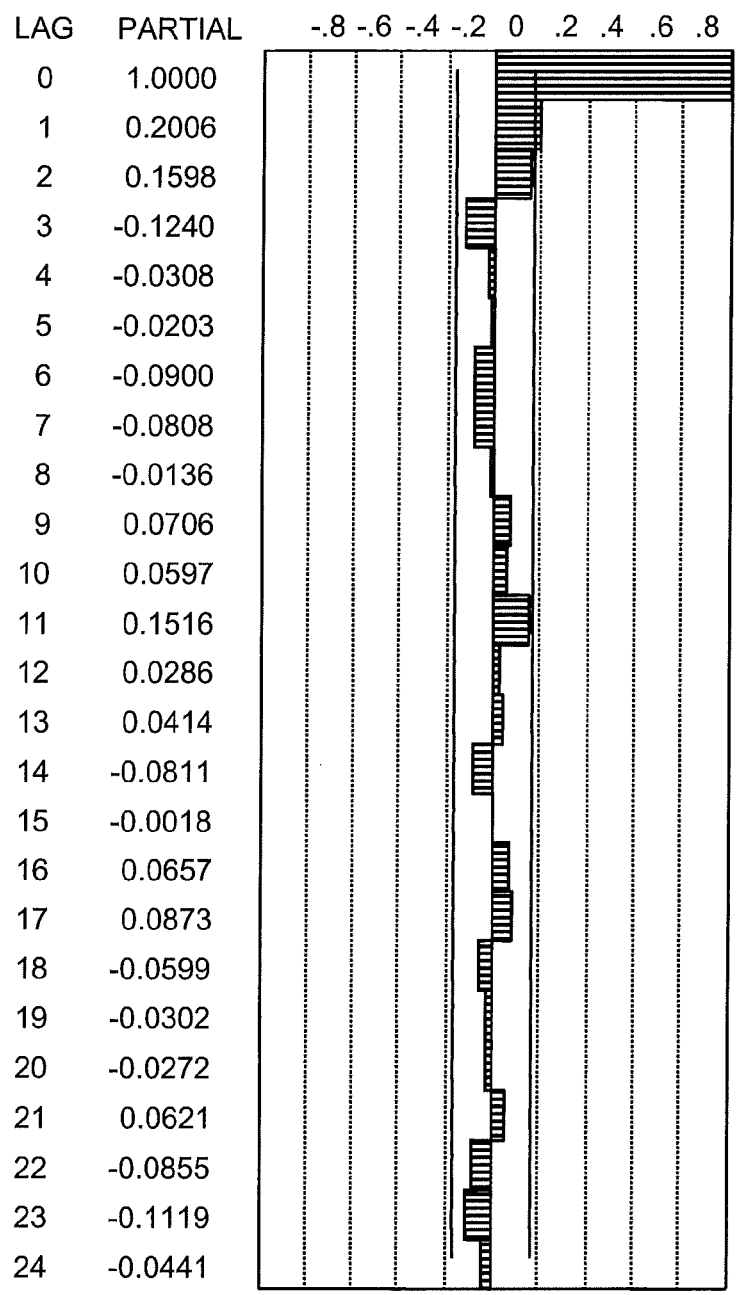

In the preferred embodiment, for each image counts time-series 305, the first step is to estimate the order of the time-series model 310. The initial values for p and q are determined based on the autocorrelation plot (ACF) and partial autocorrelation plot (PACF) of the data (Brockwell and Davis, supra, pp 94-95). If the ACF exponentially decays to zero or shows damped oscillations while decaying to zero, the initial value of p is chosen to be one less than the lag at which the PACF drops to zero, where it is typical to consider a 95% confidence interval band around zero instead of exactly zero value. If the ACF shows one or more spikes, the initial value of q is chosen to be one less than the lag at which the ACF becomes zero (typically, within a 95% confidence band around zero). Based on experiments on a large number of consumer collections, the case where the ACF does not decay to zero or decays very slowly indicating severe non-stationarity that requires high order of differencing was not found in this domain. So the initial estimate of d is set to 1. An example is shown in FIG. 5. FIG. 5(a) shows an image counts time-series covering one year with a calendar day as the time unit. FIG. 5(b) shows the ACF plot and FIG. 5(c) shows the PACF plot. The solid vertical lines show the 95% confidence interval. Both plots show significant values till a lag of 2 and decay to zero after that. Based on this information, the p and q values are set to 1. The value of d is at the default level of 1.

Referring to FIG. 4, a set of ARIMA models are fitted 315 to the image counts time-series to include variations around the initial estimates of the order parameters. Models with all combinations of p+1/p/p−1, d+1/d/d−1, q+1/q/q−1 are generated. Note that all of these combinations may not strictly be ARIMA processes, they could degenerate to AR, MA or ARMA if some orders are zero e.g. d=0 corresponds to an ARMA (p, q) model. The model fitting process determines the values of $\phi$ and $\theta$ in equation (1). Note that the number of parameters that need to be determined equals p+q+1 since there are p $\phi$ parameters, q $\theta$ parameters and the additional parameter is the standard deviation of the error term, $\epsilon$. The model fitting process is implemented in most commercially available statistical analysis software packages (e.g. JMP from SAS Corporation).

In practice, mixed models (that include auto-regressive and moving average components) such as ARIMA are difficult to identify and involve much trial and error. Some models fitted in 315 may have to be discarded on the basis of poor parameter estimation or poor fit to the data. This is done in step 320 based on the following two checks: (1) some of the model parameters for the ARIMA models fitted in 315 may have a t-Ratio less than 2, which indicates that the probability that the parameter value is zero is greater than 5%. This indicates a relatively low confidence in the parameter values generated by the fitting process, and these ARIMA models are discarded; (2) the residuals are computed between the models fitted in 315 and the image counts timeseries. The residuals are defined as the difference between the value predicted by the model and the actual value at that time instant. In the ideal case, where the model fits the data well, the residual is approximately iid (independent and identically distributed). If the residuals are iid, the ACF plot of the residuals will have values that are within the 95% confidence level for all lags. If this is not the case for more than 3 out of 40 lags, or if one falls far outside the 95% bounds, the iid hypothesis can be rejected (Brockwell and Davis, supra, pp 166-167). The ARIMA model does not fit the data very well in this case, and it is discarded.

The remaining models all fit the data and are viable. The identification of the best model can be based on a number of criteria used to determine the goodness-of-fit (Brockwell and Davis, supra, pp 171-174). In the preferred embodiment, the Akaike Information Criterion (AICC) is used as a goodness-of-fit measure, as defined in Brockwell and Davis, supra, pp 171. This criterion is computed 325 for the ARIMA models remaining after step 320. The model showing the best (lowest) value of AICC is selected 330.

The ARIMA model is very commonly used in forecasting for economic and financial markets, and it is well known to persons skilled in the art that most commercially available statistical analysis software packages include tools for fitting ARIMA models by specifying the p, d and q values (e.g. JMP from SAS corporation, Autobox from Automatic Forecasting Systems and Forecast Pro from Business Forecast Systems Inc.), as well as tools for analyzing the ACF and PACF plots and performing the tests mentioned above.

Figure 6:
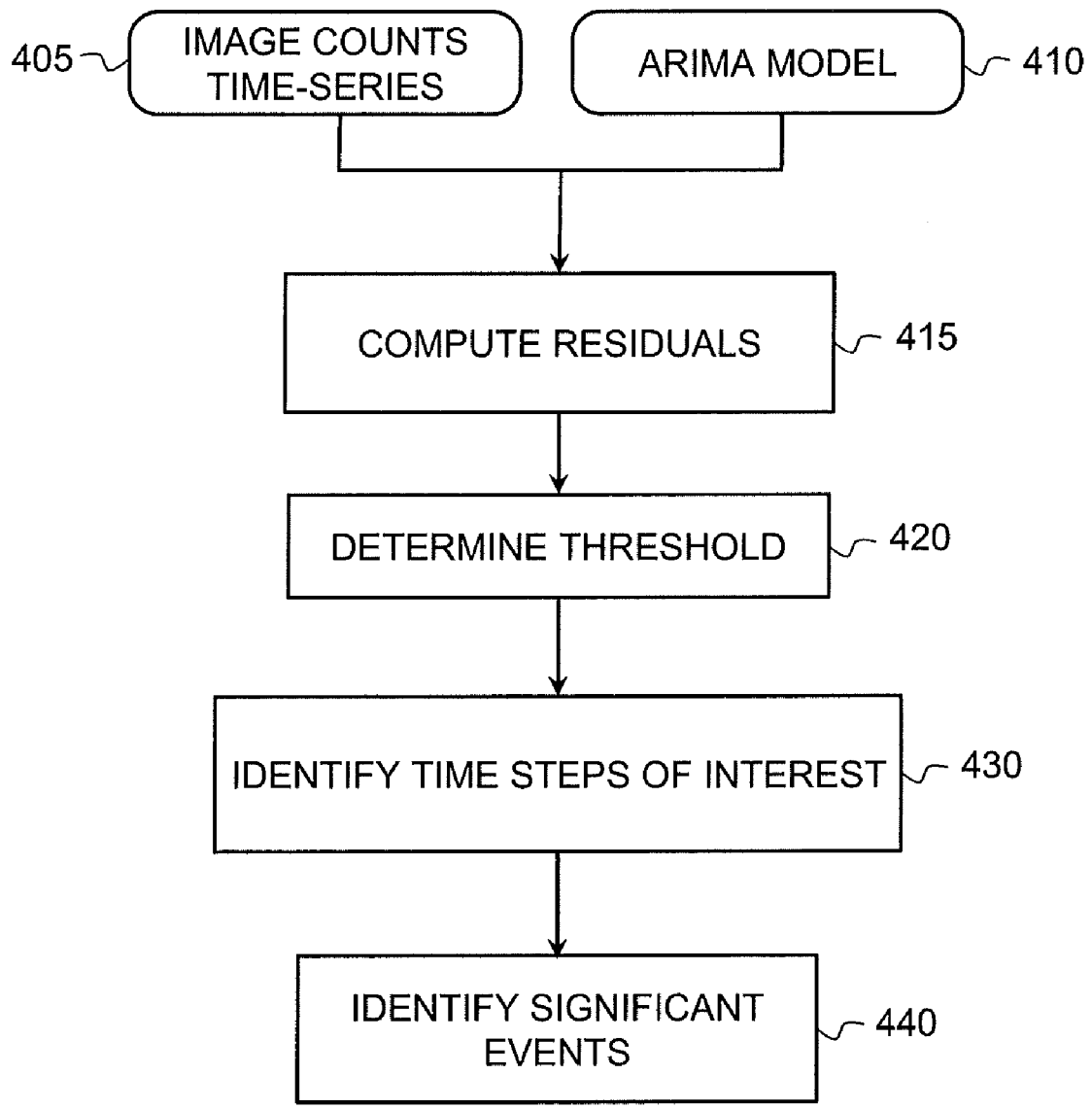
FIG. 6 is a more detailed flowchart of the significant event detector shown in block 120 of FIG. 2.

Referring to FIG. 2, the selected ARIMA model in step 330 is provided to the significant event detector 120 that is used to determine significant events in the collection. FIG. 6 shows the steps followed in the significant event detector 120. Referring to FIG. 6, the predicted output of the selected ARIMA model 410 is compared with the image counts time-series 405 that was used to generate the model. Residuals are computed 415 as the difference between the predicted output of the model and the image counts time-series at each time step. The variance (a) of the residuals is computed and a threshold is determined 420 based on this variance. In the preferred embodiment, a threshold of $\sigma/3$ is used. The time steps where the absolute value of the residual is greater than the threshold are identified as "time steps of interest" 430. Significant events are identified 440 by merging adjacent time steps of interest and by retaining only the time steps or merged group of time steps that have image counts above a minimum threshold. In the preferred embodiment, this minimum threshold is the mean image count of the image counts time-series.

Figure 7:
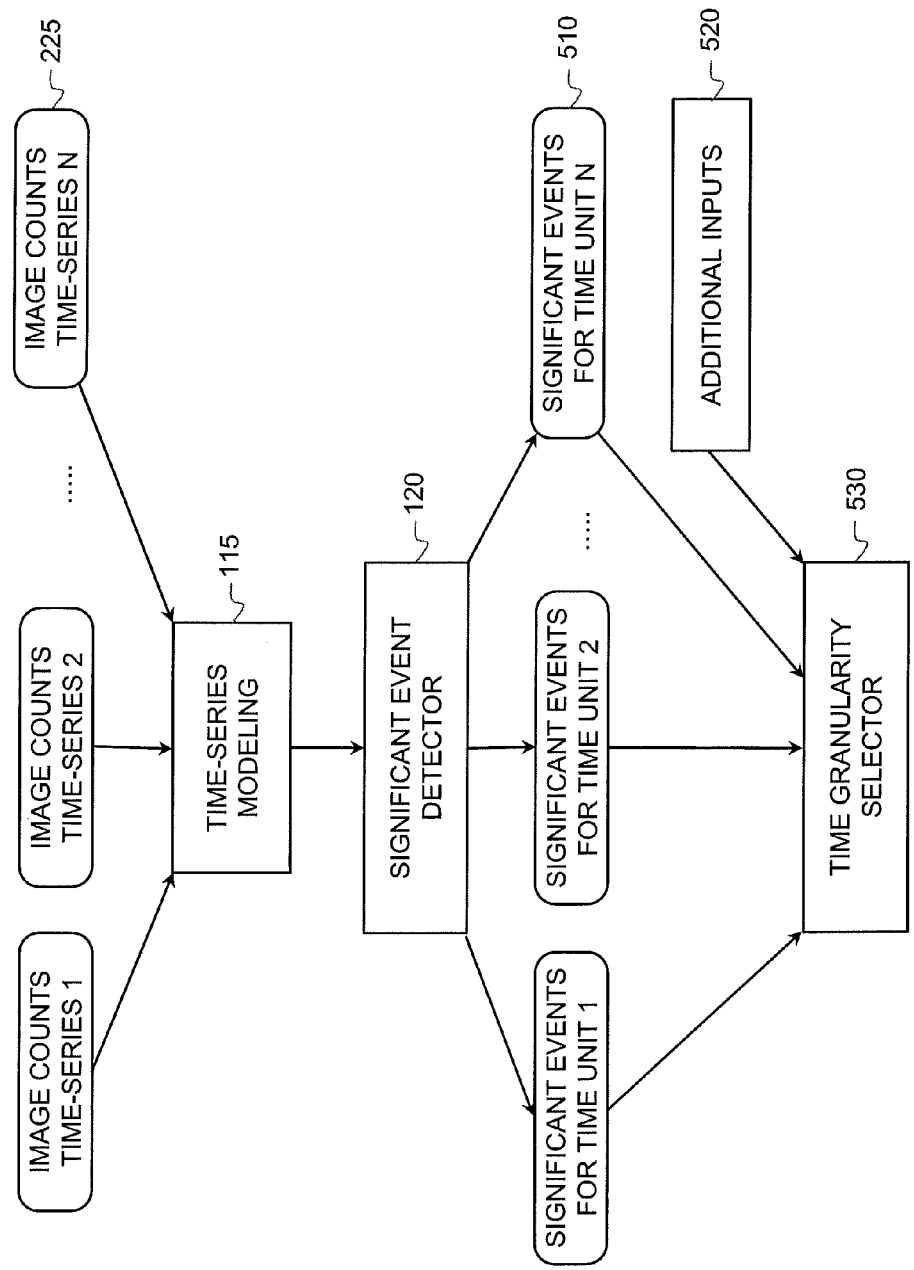
FIG. 7 is a flowchart of the time granularity selection method in accordance with the present invention.

Referring to FIG. 7, each of the image counts time-series generated in step 225 are passed through time-series modeling 115 and significant event detection 120 to produce significant events at different time granularities 510. These significant events 510 are made available to the time granularity selector 530 which selects the set of significant events to use based on additional inputs 520. The additional inputs can include user actions, system requirements or user preferences. In a browsing application, significant events can be selected at the time granularity at which the user selects to view the collection. For example, if the user is viewing a short time-span of a single day, significant events at the finest granularity are shown; whereas, if the user is viewing the collection over five years, significant events at the weekly time granularity is appropriate. The system requirement in terms of display capability can also dictate the number of significant events, and therefore, the granularity selected. For example, if approximately 10 events will fit the display, then the granularity is selected so that the number of significant events is close to that number. The user may also set the preference for viewing significant events at a certain granularity.

The invention has been described in detail with particular reference to certain preferred embodiments thereof, but it will be understood that variations and modifications can be effected within the spirit and scope of the invention.

| PARTS LIST | |
|---|---|
| 10 | Computer |
| 20 | Processor |
| 30 | Memory |
| 50 | Input device |
| 60 | Keyboard |
| 70 | Display Device |
| 80 | Network connection |
| 105 | Digital image collection |
| 110 | Time-series generator |
| 115 | Time-series modeling step |
| 120 | Significant event detector |
| 205 | Extract date/time step |
| 215 | Accumulators for different time units |
| 225 | Group of image counts time-series |
| 305 | Image counts time-series |
| 310 | Estimate initial parameters step |
| 315 | Fit ARIMA models step |

PARTS LIST

| | |
|---|---|
| 320 | Choose viable models step |
| 325 | Compute goodness-of-fit measures step |
| 330 | Choose best ARIMA model step |
| 405 | Image counts time-series |
| 410 | ARIMA model |
| 415 | Compute residuals step |
| 420 | Determine threshold step |
| 430 | Identify time steps of interest step |
| 440 | Identify significant events step |
| 510 | Significant events |
| 520 | Additional inputs |
| 530 | Time granularity selector |

The invention claimed is:

1. A method for determining significant events in a digital image collection, comprising, using a processor for:
   a) generating image counts time-series from the image collection;
   b) computing a model of the image counts time-series, wherein the model is an ARIMA(p,d,q) model; and
   c) using the image counts time-series and the model to determine significant events.

2. The method of claim 1, wherein the model is selected from a plurality of models using a goodness-of-fit score.

3. The method of claim 1, wherein step c) includes
   i) computing a set of residuals, wherein a residual is the difference between the image counts time-series and the image count predicted by the model at each time unit;
   ii) identifying time steps of interest which have residuals above a computed threshold; and
   iii) merging contiguous time steps of interest, and applying an image counts threshold to the merged contiguous time steps of interest to determine significant events.

4. The method of claim 1, wherein the image counts time-series in step a) are generated at different time granularities.

5. A method for determining significant events in a digital image collection, comprising, using a processor for:
   a) generating image counts time-series from the image collection at different time granularities;
   b) computing a model of the image counts time-series at each time granularity, wherein the model is an ARIMA (p,d,q) model;
   c) using the image counts time-series and the model to determine significant events at each time granularity; and
   d) determining the significant events based on user actions or system requirements.

6. The method of claim 5, wherein the model is selected from a plurality of models using a goodness-of-fit score.

7. The method of claim 5, wherein step c) includes
   i) computing a set of residuals, which is the difference between the image counts time-series and the image count predicted by the model at each time unit;
   ii) identifying time steps of interest which have residuals above a computed threshold; and
   iii) merging contiguous time steps of interest, and applying an image counts threshold to the merged contiguous time steps of interest to determine significant events.

* * * * *